Aug. 17, 1965　　　L. HIMMEL　　　3,201,757
IDENTIFICATION SYSTEM
Filed Sept. 29, 1960　　　3 Sheets-Sheet 1
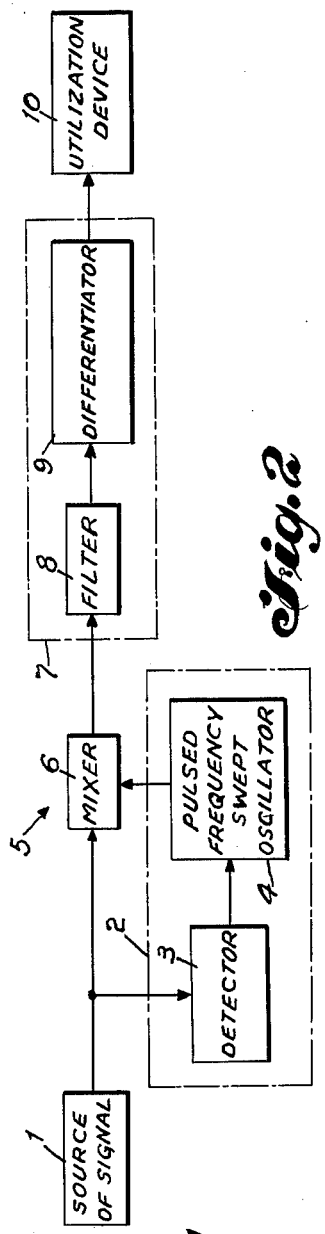
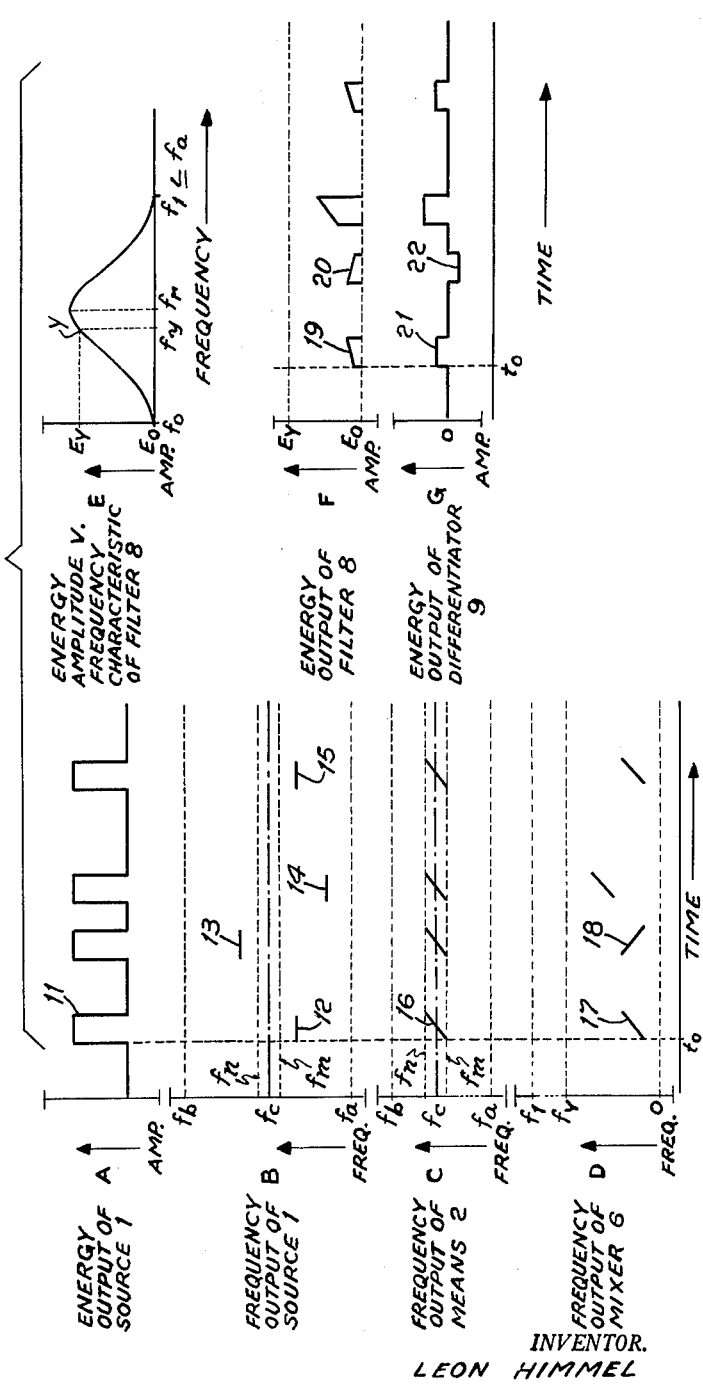
INVENTOR.
LEON HIMMEL
BY
Norman R. Bardales
ATTORNEY Aug. 17, 1965    L. HIMMEL    3,201,757
IDENTIFICATION SYSTEM
Filed Sept. 29, 1960    3 Sheets-Sheet 2
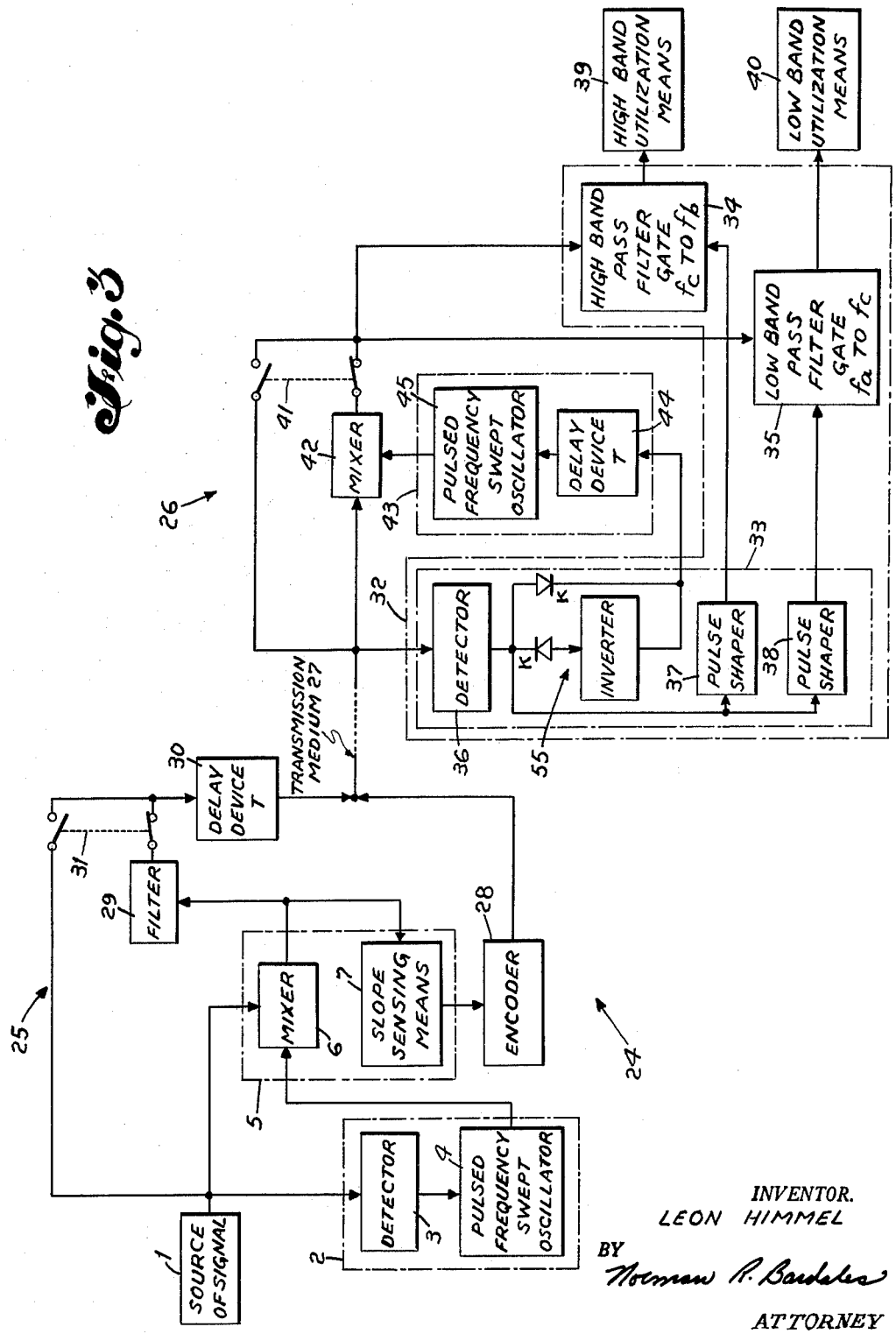
INVENTOR.
LEON HIMMEL
BY Norman R. Bardales
ATTORNEY

INVENTOR.
LEON HIMMEL

United States Patent Office 3,201,757
Patented Aug. 17, 1965

3,201,757
IDENTIFICATION SYSTEM
Leon Himmel, Cedar Grove, N.J., assignor to International Telephone and Telegraph Corporation, Nutley, N.J., a corporation of Maryland
Filed Sept. 29, 1960, Ser. No. 59,299
20 Claims. (Cl. 340—171)

This invention relates to identification systems and more particularly to identification systems that indicate the sense of the relative frequency relationship of a signal with respect to a reference frequency.

In many electronic systems, it is often desirable to identify the relative frequency position of a signal in relation to a reference frequency. For example, in many radar and communication applications, it is often necessary to determine the drift in frequency of a local oscillator designed to be maintained at a fixed center frequency, so that measures may be taken to arrest the drift and return the local oscillator to its center frequency. Therefore, it is apparent that some means must be devised to detect not only the drift of the local oscillator from the center frequency, but also the direction or sense of that drift. In other communication systems, as for example, in frequency modulation systems, it is often desired to have a prior knowledge of the relative frequency relationship of a side band component with respect to the carrier or center frequency. In still other systems, which utilize the beat frequency signal produced by a heterodyning process, it is often desirable to be able to identify whether a particular beat frequency signal was produced by a signal having a frequency displaced below that of the local oscillator frequency as distinguished from one produced by a signal whose frequency is displaced above the local oscillator frequency. Having this information it would then be possible to employ narrow bandwidth demodulation systems, one for the signal above the reference frequency and one for the signal below the reference frequency, and select the appropriate one with the information obtained for demodulation of the signal.

An object of this invention is to provide an identification system that determines the relative frequency position of a signal with respect to a reference frequency.

Another object of this invention is to provide an identification system to produce an identification signal indicative of the relative position of the frequency of an intelligence signal employed in a communication system with respect to a reference frequency so as to control the reception of the intelligence signal.

A feature of this invention is the provision of an identification system for a first signal having a frequency within a given band comprising means to provide a second signal having a reference frequency within the given band and means to identify the relative position of the frequency of the first signal with respect to the reference frequency.

Another feature of this invention is the provision of a communication system comprising a source of first signal having a frequency within a given band, a source of reference signal having a reference frequency within the given band, means responsive to the first signal and reference signal to provide an identification signal indicative of the relative position of the frequency of the first signal with respect to the reference frequency and means responsive to the identification signal to control the extraction of the first signal.

The above mentioned and other features and objects of this invention will become more apparent by reference to the following description taken in conjunction with the accompanying drawings in which:

FIG. 1 is a schematic diagram in block form of the identification system of this invention;

FIG. 2 is a set of curves helpful in explaining the operation of the system of FIG. 1;

FIG. 3 is a schematic diagram in block form of a communication system utilizing an identification system in accordance with the principles of this invention.

Figure 4:
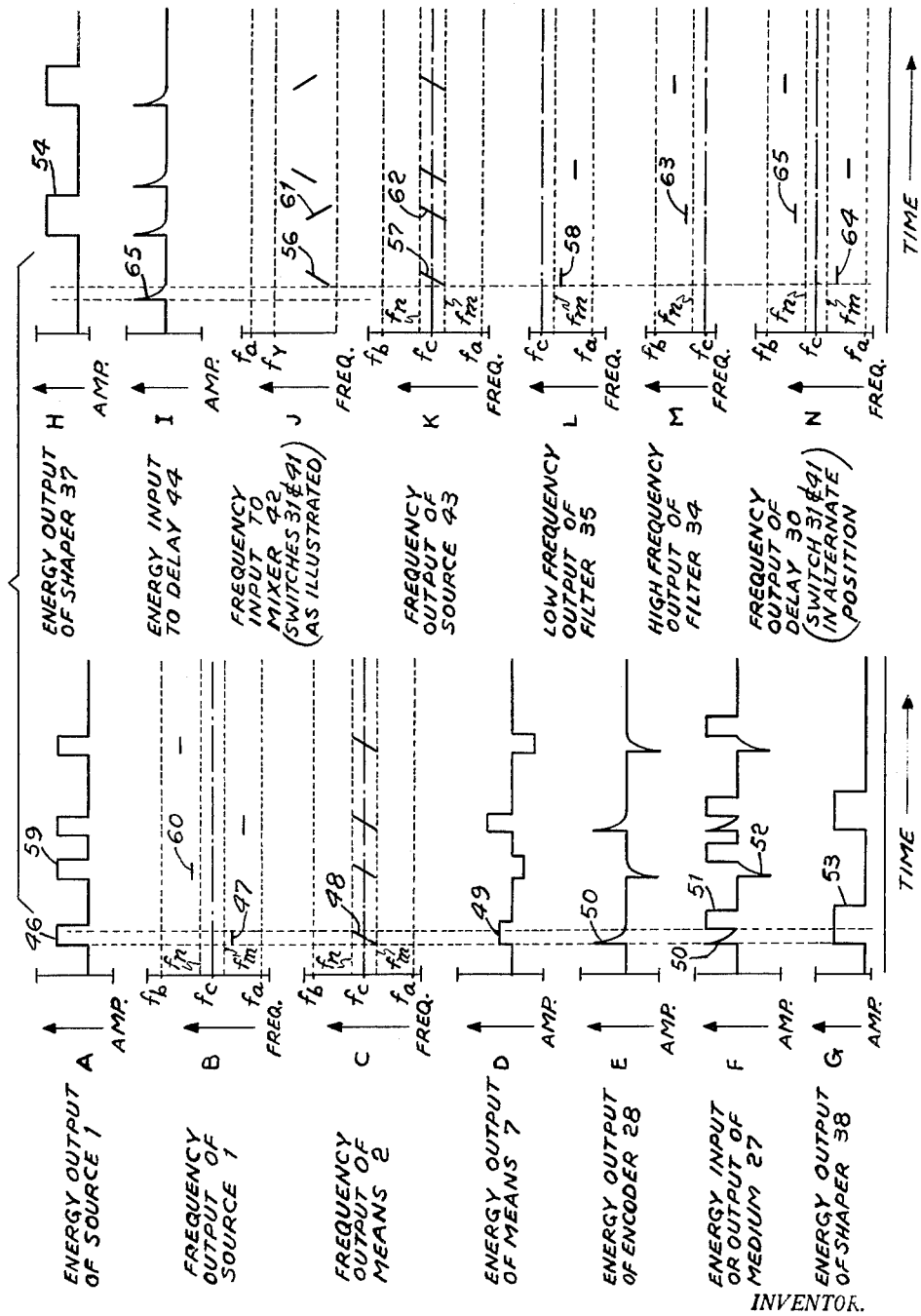
FIG. 4 is a set of curves helpful in explaining the operation of the system of FIG. 3.

Referring to FIG. 1, there is illustrated an identification system for a signal having a frequency within a given band at the output of source 1. Means 2 provides a signal having a reference frequency within the given band comprising detector 3 and pulsed frequency swept oscillator 4. Coupled to the outputs of source 1 and means 2 is means 5 to identify the relative position of the frequency of the signal of source 1 with respect to the reference frequency of means 2. Means 5 includes mixer means 6 coupled to the output of source 1 and oscillator 4 and slope-sensing means 7 responsive to the beat frequency signal present at the output of mixer means 6. Slope-sensing means 7 may comprise, by way of example, filter 8 and a rate of change sensing means, such as differentiator 9. The output of means 7 is coupled to a suitable utilization device 10 which may be, by way of example, an encoder, a signal storage device, a signal translating device, a signal detecting or extracting device, a display device, such as a meter or CRT device, or a part of some servo or error correcting system.

Referring to FIGS. 1 and 2, the operation of the system of FIG. 1 will now be explained. Source 1 provides a signal having a frequency within a given band illustrated for purpose of explanation in Curve A, FIG. 2, as pulse 11, having a discrete, fixed frequency as is illustrated by line 12, Curve B, FIG. 2. It is to be understood, however, that the subsequent signals from source 1, illustrated in Curve A, FIG. 2, may have different frequencies, as illustrated by lines 13 and 14 in Curve B, FIG. 2 or, if desired, the same frequency as signal 11 as illustrated by line 15 in Curve B, FIG. 2, without affecting the operation of this invention provided the signal has a frequency within the given band, $f_a$–$f_b$. It will be noted that signal 11 of source 1 has a frequency which is displaced from an arbitrarily selected reference frequency $f_c$, illustrated as the dash-dot line in Curve B, FIG. 2, located in the band $f_a$–$f_b$.

Means 2, a source of signal, by coaction of detector 3 and the pulsed frequency swept oscillator 4, provides a signal having a swept or varying frequency characteristic including the reference frequency $f_c$ illustrated by line 16, Curve C, FIG. 2. For the sake of clarity, the reference frequency $f_c$ is illustrated in Curve C, FIG. 2 as being centered in the swept frequency characteristic. However, the reference frequency may be located anywhere along the swept frequency characteristic without affecting the operation of the invention. The oscillator 4 is swept through a frequency range $f_m$–$f_n$, Curve C, FIG. 2, which, for optimum utilization of the band $f_a$–$f_b$ should be maintained as small as possible. To assure that the sweeping of the output signal of oscillator 4 occurs during the presence of signal 11 from source 1, detector 3 detects the presence of signal 11 and initiates the frequency swept output signal from oscillator 4, in a manner well known to those skilled in the art. While the source of signal, means 2, has been described with reference to specific apparatus for its initiation, it is to be understood that other means may be devised to provide a signal having the frequency characteristic illustrated in Curve C, FIG. 2. For example, if the signals, or pulses, of source 1, illustrated in Curve A, FIG. 2, have a fixed pulse repetition frequency, not illustrated, then means 2 of FIG. 1 need only comprise a swept frequency oscillator having a pulse repetition frequency equal to that of the signals of source 1 and properly synchronized thereto.

Means 5 identifies the relative position of the frequency of signal 11 of source 1 with respect to the reference frequency $f_c$ as follows. Mixer means 6 has coupled to the inputs thereof the signals from source 1 and means 2, having the frequency characteristics illustrated by line 12, Curve B, and line 16, Curve C, FIG. 2. Consequently, mixer means 6 will produce at its output a plurality of signals, one signal having a frequency characteristic equal to the frequency characteristic of the signal from source 1, one signal having a frequency characterstic equal to the frequency characteristic of the signal from means 2, one signal having a frequency characteristic equal to the sum of the frequency characteristics of the signals of source 1 and means 2, and one signal having a frequency characteristic equal to the difference between the frequency characteristics of the signals of source 1 and means 2. The latter signal is commonly known as the beat frequency signal having a frequency characteristic as is illustrated by line 17, Curve D, FIG. 2. It will be noted by reference to Curves B and D, FIG. 2, that the beat frequency signal has a swept frequency characteristic whose direction of slope is indicative of the relative position of the frequency of the signal of source 1 with respect to the reference frequency $f_c$. Thus, the beat frequency signal produced by mixing signal 11 of source 1 having a frequency characteristic as illustrated in line 12, Curve B, FIG. 2, disposed below the reference frequency $f_c$, with the signal of means 2 having a frequency characteristic as illustrated in line 16, Curve C, FIG. 2, will have a positive rising slope as illustrated by line 17, Curve D, FIG. 2. However, a signal from source 1 having a frequency characteristic as illustrated by line 13, Curve B, FIG. 2 disposed above the reference frequency $f_c$ will produce a beat frequency signal having a negative or descending slope as illustrated by line 18, Curve D, FIG. 2 when mixed with the signal of means 2. It will be apparent to one skilled in the art, that means 2 could produce a signal having a negative swept frequency characteristic which includes the center frequency $f_c$ without departing from the scope of this invention. In that case the slopes of the beat frequency signal would be opposite to that previously mentioned, i.e., negative when the frequency of a signal of source 1 is disposed below the center frequency and positive when the frequency of a signal of source 1 is disposed above the center frequency. Nor is it essential for the operation of the present invention that the frequency swept characteristic of the signal of means 2 be linear but, as will be obvious to those skilled in the art, may exhibit some degree of non-linearity without affecting the principles of this invention.

Slope-sensing means 7 is responsive to the beat frequency signal output of mixer 6 to produce an output signal indicative of the relative position of the frequency of the signal 11 of source 1 with respect to the reference frequency $f_c$. Filter 8 of slope-sensing means 7 is selected to have an energy amplitude versus frequency characteristic as illustrated in Curve G, FIG. 2, i.e., one in which the energy amplitude of the output signal of filter 8 is proportional to the frequency characteristic of the signal applied to its input. Filter 8 has a band pass region from $f_0$ to $f_1$ and a center frequency $f_r$. The beat frequency signal at the output of mixer 6, operates on the rising portion of the characteristic curve of filter 8 designated by the line $f_0 - Y$, Curve E, FIG. 2. Thus, as the frequency characteristic of the beat frequency signal, such as is illustrated by line 17, Curve D, FIG. 2, rises in frequency, a corresponding increase in energy amplitude of the output signal from filter 8 is produced as is illustrated by line 19, Curve F, FIG. 2. The converse action occurs for a beat frequency signal having a frequency characteristic illustrated by line 18, Curve D, FIG. 2 that descends in frequency, i.e. one having a negative slope frequency characteristic, viz., a corresponding decrease in energy amplitude of the output signal of filter 8 results, such as illustrated by line 20, Curve F, FIG. 2. The frequency $f_r$ is preferably selected to coincide with the maximum possible beat frequency signal obtainable, viz., one that is obtained by mixing the signal from source or means 2 with a signal from source 1 having a frequency $f_a$ or $f_b$. Frequencies $f_a$ or $f_b$ represent the lower and upper extremes, respectively, of the band in which the signals from source 1 are confined, as mentioned hereinabove. Filter 8, as shown in FIG. 1, is a low pass filter having a cut-off frequency $f_1$ which is made less than or equal to $f_a$ so as to attenuate signals having frequencies equal to or greater than $f_a$ at the output of mixer means 6 and thereby insure passage of only the beat frequency signal, the latter being relatively smaller than $f_a$. It should be observed that the output signal of filter 8 is indicative of the relative position of the frequency or signal from source 1 with respect to the reference frequency due to its slope characteristics. This signal output of filter 8 could be used to provide the desired information. However, it is preferable in certain applications to develop in response to the output signal of filter 8 a pulse signal that may be employed to initiate operation of succeeding circuitry. Thus, a rate of change sensing means, such as differentiator 9, is made responsive to the output signal from filter 8. The resultant output signal from differentiator 9, the identification signal, has a first characteristic indicative of the frequency of the signals of source 1 being disposed below the reference frequency $f_c$ and a second characteristic indicative of the frequency of the signals of source 1 being disposed above the reference frequency $f_c$. In the example illustrated in FIG. 2, differentiator 9 produces a positive pulse 21, Curve G, FIG. 2 for a signal of source 1 having a frequency below the reference frequency $f_c$, such as illustrated by line 12, Curve B, FIG. 2, and a negative pulse 22, Curve G, FIG. 2 for a signal of source 1 having a frequency above the reference frequency $f_c$, such as illustrated by line 13, Curve B, FIG. 2.

In practice, as stated previously, means 2 provides an output signal whose frequency is swept in a very limited range $f_m - f_n$, as compared to the band $f_a - f_b$, Curve C, FIG. 2. To assure no ambiguity in the identification signal due to reversing slope characteristics of the output signal of mixer 6, it is preferable to make the sweep range $f_m - f_n$ extremely small and have the frequency of the signal from source 1 outside the range $f_m - f_n$.

Referring to FIG. 3, there is illustrated therein a communication system employing the identification system of this invention, as described hereinabove with respect to FIG. 1. The manner in which the identification system of this invention is incorporated in the communication system will be described hereinbelow employing the reference characters employed in FIG. 1 for the identical components contained in the communication system of FIG. 3.

Briefly, the communication system comprises a source of signal, such as source 1, wherein the signal has a frequency within a given band, a source or reference signal, such as means 2, with the reference signal having a reference frequency $f_c$ within said given band, a means 5 responsive to the signal of source 1 and the reference signal of means 2 to provide an identification signal indicative of the relative position of the frequency of the signal of source 1 with respect to the reference frequency $f_c$, and means 24 responsive to the identification signal at the output of means 5 to control the reception and extraction of the signal from source 1.

More specifically the communication system of this invention may be described as that type of communication system employing a sending station including equipment 25 and a receiving station including equipment 26 interconnected by a transmission medium 27. In this type of system, source 1 can be considered as a signal locally generated in the sending station or a source of signal, such as the preceding transmitter in a communication link or any other type of communication signal which is desired to be sent to a receiving station via transmission medium 27. The communication system of this invention may take still a second form where source 1 is a remote transmitter and the remainder of the circuitry in FIG. 3, namely, equipments 25 and 26, as well as, transmission medium 27, is a receiving system operating to supply the identification signal and couple the signal from source 1 to equipment 26 for selection of the path the signal from source 1 will take for extraction, demodulation and utilization. Regardless of which type of communication system is considered the identification system described in connection with FIG. 1 and illustrated in FIG. 3 responds to provide an identification signal indicative of the relative position the frequency of the signal of sourse 1 has with respect to the reference frequency $f_c$. The identification signal is then utilized either in its original form or in a coded form to control the extraction of the signal of source 1 in equipment 26.

Keeping these alternatives in mind and the common, broad operation of the system, the system will be described in connection with the former type of communication system, namely, that type of communication system where equipment 25 is a sending station and equipment 26 is a receiving station. Accordingly, the communication system comprises at least one sending station and at least one receiving station, in the form of equipments 25 and 26, respectively, coupled by means of transmission medium 27 which may be, for example, a pair of conductors, coaxial cable, or a radio transmitter and receiver system. Equipment 25 includes means 5 responsive to a signal having a frequency within a given band from source 1 and the reference signal of means 2 having a reference frequency $f_c$ within the given band to provide an identification signal indicative of the relative position of the frequency of the signal of source 1 with respect to the reference frequency $f_c$. It should be recalled that source 1 need not be a part of equipment 25, the sending station, but may be coupled thereto from a remote point. The same is true of means 2. The identification signal at the output of means 5 could be coupled directly to equipment 26. Preferably, however, encoder 28 codes the identification signal in a predetermined manner, such as by a pulse position, frequency, amplitude and the like type of code, to provide a coded identification signal at the output of equipment 25 which is distinctive from the signal of source 1. Thus, encoder 28 and means 24 are a specific embodiment of utilization device 10 of FIG. 1. If frequency code signals are employed, it is understood that the code frequencies would be outside the intelligence bandwidth.

There are several methods of conveying the signal of source 1 to equipment 26 to enable the extraction thereof under control of the identification signal or its coded counterpart. Two methods are illustrated in FIG. 3 and will be described herein. In the first method, the beat frequency signal, a frequency translated version of the signal of source 1, at the output of mixer means 6 is passed by filter means 29 to a time delay means 30, and hence, to transmission medium 27 for coupling to equipment 26. The second method of source 1 is to couple the signal directly to delay means 30 without any frequency translation by operation of the ganged switch 31 from its illustrated normal position. Each of these methods will be described in greater detail hereinafter. The time delay T of delay means 30 must be sufficient to permit the coded identification signal at the output of encoder 28 to precede the signal of source 1 or its frequency translated counterpart thereof to enable the coded identification signal to control the extraction and reception thereof in means 32 of equipment 26.

Means 32 comprises decoder 33 and bandpass gates 34 and 35. Gates 34 and 35 may be tuned gated amplifiers each of which acts as a filter device to pass a certain band of frequencies, for instance, gate 34 will pass all frequencies above and gate 35 will pass all frequencies below the reference frequency present at the inputs thereof, as will be hereinafter described in greater detail. The decoder 33 comprises a detector 36 which detects the coded identification signal at the output of medium 27. The output of detector 36 is coupled to a pair of pulse shapers 37 and 38 which are responsive to a selected one of the characteristics of the coded identification signal. For example, shaper 37 responds to that characteristic of the coded identification signal indicating when the signal of source 1 has a frequency disposed above the reference frequency and shaper 38 responds to the characteristic of the coded identification signal indicating when the signal of source 1 has a frequency disposed below the reference frequency. The output signals of pulse shapers 37 and 38 control the operation of gates 34 and 35, respectively. Coupled to the outputs of gates 34 and 35 are suitable utilization devices 39 and 40 which utilize the signal passed to the inputs thereof. Devices 39 and 40 may take the form of demodulators, storage devices, translators and the like.

Under the aforementioned first method of sending the signal of source 1, the switch 41 is in the position illustrated in FIG. 3 coupling the output of mixer 42 to gates 34 and 35. Under this method, the mixer 42 is made responsive to the frequency translated signal of source 1 and the signal from source 43. Source 43 comprises a suitable delay means 44 having a delay period T equal to the delay period of delay means 30 disposed in equipment 25 and a pulsed frequency swept oscillator 45 whose operation is controlled by the action of the detector 36, as will be described hereinafter. It is obvious to one skilled in the art that the position of the delay means 44 and oscillator 45 may be interchanged without affecting the operation of source 43. If the second method is utilized, then switch 41 is engaged in the position opposite to the position illustrated in FIG. 3 and the signal of source 1 is coupled directly to gates 34 and 35.

Referring to FIG. 4, the operation of FIG. 3 will now be explained with switches 31 and 41 in the illustrated positions, the first method described hereinabove. Source 1 provides a signal, illustrated by way of example only, as pulse 46 having a fixed energy amplitude, curve A, FIG. 4, and having a frequency displaced from the reference frequency $f_c$ and contained within the band $f_a-f_b$ as illustrated by the line 47, Curve B, FIG. 4. Means 2 upon detection of signal 46 of source 1 provides within the band $f_a-f_b$ a reference signal having a varying frequency characteristic as illustrated by line 48, Curve C, FIG. 4, the varying frequency characteristic including therein reference frequency $f_c$. As described in connection with the system of FIG. 1, detector 3 causes pulsed frequency swept oscillators 4 to produce a signal having the frequency characteristic illustrated by line 48, Curve C, FIG. 4 at the output thereof, viz., a swept frequency characteristic, which in turn is fed to means 5. A heterodyning action takes place due to the presence of the mixer 6 providing at the output thereof a plurality of signals, one including the frequency of the signal of source 1, one including the frequency of the signal of means 2, one including the sum of the frequencies of these two signals, and one including the difference of the frequencies of these two signals. As explained in the operation of the system of FIG. 1, slope sensing means 7 is responsive to the difference or beat frequency signal at the output of mixer 6 and provides an identification signal 49, Curve D, FIG. 4, indicative of the relative position of the frequency of the signal of source 1 with respect to the reference frequency $f_c$. Encoder 28 imparts a given code characteristic to signal 49, Curve D, FIG. 2 for transmission in medium 27. By way of example only, the code characteristic, as illustrated in Curve E, FIG. 4, is a pulse having a distinguishable width relative to the width of signal 46 produced in any well known manner, such as by differentiation and clipping the leading edge of the pulses of Curve D, FIG. 4 maintaining the relative polarity of the pulses of Curve D, FIG. 4. The positive pulse of Curve E, FIG. 4 is utilized to indicate that the frequency of a signal of source 1 is disposed below the reference frequency $f_c$ while the negative pulse thereof indicates that the frequency of a signal of source 1 is disposed above the frequency $f_c$. It is to be understood that the code characteristic could be of another type without departing from this invention such as a distinguishing amplitude. The signal from encoder 28 is coupled to the input of medium 27. At some time T later, as controlled by delay means 30, the output signal from mixer 6 is also coupled to the input of medium 27. Thus, the frequency translated version of signal 46 is preceded by its coded identification signal 50, Curve E, FIG. 4. The composite signal present at the input as well as the output of medium 27 is illustrated in Curve F, FIG. 4, as including coded identification signal 50 and the delayed frequency translated version of signal 46 identified as signal 51.

Means 32 disposed in the receiving station is responsive to the identification signal 50, Curve F, FIG. 4, and controls the reception and extraction of signal 51 to be passed to the appropriate one of utilization means 39 and 40. The signals present on transmission medium 27 as illustrated in Curve F, FIG. 4, are coupled to detector 36 and mixer 42. Detector 36 operates to separate the coded identification signals and the frequency translated version of signal 46 one from the other to utilize the coded identification signal to properly route the signals at the output of mixer 6 to their appropriate utilization means 39 or 40. Thus, detector 36 distinguishes the relative width of signals 50 and 51 of Curve F, FIG. 4 passing to the output thereof only the coded identification signal, such as signal 50. The output signal from detector 36 is coupled to pulse shapers 37 and 38 which may be in the form of multivibrators to produce a gate or enable signal upon the occurrence of the leading edge of the appropriate one of the coded identification signals. The duration of the pulse produced by triggering of the leading edge of the coded identification signal is adjusted to be at least time coincident with the delayed frequency translated version of signal 46, such as signal 51, Curve F, FIG. 4. In the illustration being described shaper 37 would be arranged to respond to only the negative polarity coded identification signal, such as signal 52, Curve F, FIG. 4, and shaper 38 would be arranged to respond only to coded identification signals having positive polarity, such as signal 50. In response to coded identification signal 50, Curve F, FIG. 4, pulse shaper 38 produces the enable pulse as illustrated in Curve G, FIG. 4, by pulse 53 and shaper 37 in response to coded identification signal 52, Curve F, FIG. 4, produces the enable signal as illustarted in Curve H, FIG. 4, by pulse 54. These enable pulses, as controlled by the coded identification signal, are coupled to gates 34 and 35, respectively, to enable these gates for passage of their associated version of the signals from source 1 to the appropriate one of utilization means 39 and 40. The output from detector 36 is also applied to an arrangement indicated at 55 to produce from both the positive and negative coded identification signals positive pulses in time coincidence with the coded identification signals as illustrated in Curve I, FIG. 4. These positive pulses are coupled through delay 44, and hence, to swept oscillator 45 to initiate the production of the varying frequency characteristic output signal therefrom for application to mixer 42 to recover from the signal coupled to the input of mixer 42 the signal of source 1. The delay device 44, as pointed out hereinabove is sufficient to cause the output signal from oscillator 45 and the input signal applied to mixer 42 to be in time coincidence as illustrated in Curves J and K of FIG. 4.

To obtain an understanding of the operation of gates 34 and 35, consider first the situation when the signal of source 1 has a frequency below the reference frequency and, second, when the signal of source 1 has a frequency above the reference frequency. In the first situation the coded identification signal 50, Curve F, FIG. 4, is detected by detector 36, produces an enable pulse from the output of shaper 38 to enable gate 35 and at the same time triggers oscillator 45 through delay device 44. There now appears at the inputs of mixer 42 the signals having frequency characteristics as illustrated by lines 56 and 57 of Curves J and K, FIG. 4 respectively. It will be observed that these two signals have substantially the same varying frequency characteristic within the appropriate band $f_a$ to $f_b$, each including the reference frequency $f_c$. The beat frequency signal output from mixer 42 has a constant frequency characteristic as illustrated by line 58, Curve L, FIG. 4, since the varying frequency characteristics of the signals applied to mixer 42 have the same frequency characteristic, i.e. the same slope, and a subtraction thereof cancelled the associated frequency modulation. Thus, the frequency band in which the beat frequency signal output of mixer 42 is of a proper value to pass through gate 35 which has been enabled by the output of shaper 38 for utilization in device 40.

Now consider the second situation where the signal 59, Curve A, FIG. 4 of source 1 is above the reference frequency $f_c$, as illustrated by line 60, Curve B, FIG. 4. Then the signal applied to the input of mixer 42 from medium 27 would have a frequency characteristic as illustrated by line 61, Curve J, FIG. 4. When the signal is beat with the frequency characteristic of the output of source 43 as represented by line 62, Curve K, FIG. 4, which is opposite to the frequency characteristic represented by line 61, Curve J, FIG. 4, the original signal, as represented by line 63, Curve M, FIG. 4, may be obtained by selecting the signal representing the sum of the frequencies of the two input signals at the output of mixer 42. Thus, under these conditions, an enable pulse would be produced from shaper 37 under control of coded identification signal 52, Curve F, FIG. 4, for coupling to gate 34 which has the appropriate bandpass characteristic to pass the sum signal at the output of mixer 42 to its utilization device 39 and thereby recovering the original signal from source 1.

Thus, the coded identification signal is produced from a signal from source 1 which precedes this signal from source 1 to equipment 26 to be operated upon in decoder 33 to produce an appropriate enable pulse for application to the appropriate one of gates 34 and 35 to assure that the signal of source 1 will be passed through the appropriate utilization means. This arrangement is a positive acting arrangement which removes any possibility of ambiguity that may result if a filter arrangement were utilized at the output of mixer 42 to recover the original signal of source 1 at the output of mixer 42, that is, either the sum of the frequencies of the two signals applied to mixer 42 or the difference of the frequencies of the two signals applied thereto. In accordance with this invention, gate 34 will pass the signals above the reference frequency, the sum of the two signals applied to mixer 42, only when there is an enable signal applied thereto from shaper 37 and gate 35 will pass signals below the reference frequency, the difference of the frequencies of the two signals applied to mixer 42, only when a gate is applied thereto from shaper 38. Under this arrangement only the proper signal will be passed through the proper bandpass gate in accordance with the information contained in the coded identification signal and due to the time coincident nature of the gate device the presence of a signal outside the bandpass characteristic of the activated gate will not be passed to either of these utilization means. Thus, in equipment 26 there is disposed a means that is responsive to the frequency translated signal and the identification signal associated therewith to extract the signal of source 1 from the composite signal transmitted over medium 27 for application to the appropriate one of utilization devices 39 and 40 for further processing, routing, storage and the like.

Turning now to the second method of sending the signal from source 1 to the appropriate utilization device 39 and 40 of equipment 26. The switches 31 and 41 would be moved to their alternate position effectively disconnecting the output of filter 29 to the input of delay device 30 and the output of mixer 42 to the inputs of gates 34 and 35. The movement of switch 41 in effect removes source 43 and the output of mixer 42 from consideration in the extraction of the signal from source 1. Under this arrangement the production of the coded identification signal as illustrated in Curve E, FIG. 4 will be identical to that described hereinabove with respect to the first method of transmission. The signal from source 1 will be coupled directly to delay device 30 through medium 27 and directly to the input of gates 34 and 35. The frequency characteristic of the signal applied to the input of gates 34 and 35 is illustrated in Curve N, by line 64. The composite signal when received at the output of medium 27 by portion 26 is substantially as illustrated in Currve F, FIG. 4. Detector 36 operates as before to detect the distinguishing coded identification signals to activate shapers 37 and 38 to provide the necessary enable pulse to operate bandpass gates 34 and 35 to pass their associated signals to the proper one of the utilization means 39 and 40. Thus, referring to Curves F and N of FIG. 4, in the presence of coded identification signal 50, shaper 38 is activated to enable gate 35 so that the signal having the characteristic illustrated by line 64 in Curve N, FIG. 4, can be passed to the utilization means 40 while in the presence of a coded identification signal 52 a signal having the characteristic as illustrated by line 65, Curve N, FIG. 4, will be passed through gate 34 to utilization device 39.

It should be pointed out that the signal of source 1 in the system of FIGS. 1 and 3 need not be limited to the energy amplitude characteristics illustrated in the curves of FIGS. 2 and 4 but may have, alone or in combination, varying characteristics, such as a fixed or variable amplitude and/or frequency levels together with periodic or aperiodic pulse repetition frequencies, pulse periods and/or pulse widths. The present invention may also be utilized with a signal of source 1 having a continuous configuration, by the application of well known pulse chopping or pulse sampling techniques. In addition, the identification signals produced by means 5 and the encoded identification signal of FIG. 3 may assume other configurations or codes than those chosen to teach the principles of this invention without departing from its scope. Furthermore, it should be pointed out that the frequency band $f_a$–$f_b$ may be sub-divided, if desired, as for example, in extremely wide band frequency applications, by merely combining in parallel and/or series two or more of the devices taught in the present invention.

Thus, while I have described above the principles of my invention in connection with specific apparatus, it is to be clearly understood that this description is made only by way of example and not as a limitation to the scope of my invention as set forth in the objects thereof and in the accompanying claims.

I claim:

1. An identification system for a first signal having a frequency within a given band comprising first means to provide said first signal, second means coupled to said first means responsive to said first signal to produce a second signal having a varying frequency characteristic in said given band, said varying frequency characteristic including therein a reference frequency, and third means coupled to said first and second means responsive to said first and second signals to identify the relative position of the frequency of said first signal with respect to said reference frequency.

2. An identification system for a first signal having a frequency within a given band comprising first means to provide said first signal, second means capable of producing a second signal having a varying frequency characteristic in said given band, said varying frequency characteristic including therein a reference frequency, third means coupled to said first and second means responsive to said first signal to initiate operation of said second means upon occurrence of said first signal, and fourth means coupled to said first and second means responsive to said first and second signals to identify the relative position of the frequency of said first signal with respect to said reference frequency.

3. An identification system for a first signal having a fixed frequency within a given band comprising first means to provide said first signal, second means coupled to said first means responsive to said first signal to produce a second signal having a varying frequency characteristic within said given band, said varying frequency characteristic including therein a reference frequency, mixer means coupled to said first and second means responsive to the first and second signals to provide a beat frequency signal, and means coupled to said mixer means responsive to said beat frequency signal to provide an output signal indicative of the relative position of the frequency of said first signal with respect to said reference frequency.

4. An identification system for a first signal having a fixed frequency within a given band comprising first means to provide said first signal, second means coupled to said first means responsive to said first signal to produce a second signal having a varying frequency characteristic within said given band, said varying frequency characteristic including therein a reference frequency, mixer means coupled to said first and second means responsive to said first and second signals to provide a beat frequency signal having a varying frequency characteristic, and frequency responsive means coupled to said mixer means responsive to said beat frequency signal to provide an output signal indicative of the relative position of the frequency of said first signal with respect to said reference frequency.

5. An identification system for a first signal having a fixed frequency within a given band comprising first means to provide said first signal, second means coupled to said first means responsive to said first signal to produce a second signal having a varying frequency characteristic within said given band, said varying frequency characteristic including therein a reference frequency, mixer means coupled to said first and second means responsive to said first and second signals to provide a beat frequency signal having a varying frequency characteristic, and slope sensing means coupled to said mixer means responsive to said beat frequency signal to provide an output signal indicative of the relative position of the frequency of said first signal with respect to said reference frequency.

6. An identification sysytem for a first signal having a fixed frequency within a given band comprising first means to provide said first signal, second means coupled to said first means responsive to said first signal to produe a second signal having a varying frequency characteristic including therein a reference frequency, mixer means coupled to said said first and second means responsive to said first and second signals to provide a beat frequency signal having a varying frequency characteristic, and slope sensing means coupled to said mixer means responsive to said beat frequency signal to provide an output signal indicative of the relative position of the frequency of said first signal with respect to said reference frequency, said slope sensing means including filter means responsive to said beat frequency signal to provide a signal having an energy amplitude characteristic proportional to the varying frequency characteristic of said beat frequency signal, and a rate of change sensing means responsive to the signal at the output of said filter means to provide said output signal with a first characteristic indicative of the frequency of said first signal being disposed below said reference frequency and a second characteristic indicative of the frequency of said first signal being disposed above said reference frequency.

7. An indication system for a first signal having a fixed frequency within a given band comprising first means to provide said first signal, second means coupled to said first means responsive to said first signal to produce a second signal having a varying frequency characteristic within said given band, said frequency characteristic including therein a reference frequency, frequency mixer means coupled to said first and second means responsive to said first and second signals to provide a beat frequency signal having a varying frequency characteristic, filter means coupled to the output of said mixer means responsive to said beat frequency signal to provide a signal having an energy amplitude proportional to the varying frequency characteristic of said beat frequency signal, and differentiator means coupled to said filter means to differentiate the signal at the output of said filter means to provide a signal having a first polartity indicative of the frequency of said first signal being disposed below said reference frequency and a second polarity indicative of the frequency of said first signal being disposed above said reference frequency.

8. An indication system comprising a source of first signal having a frequency within a given band, as oscillator capable of providing a second signal having a varying frequency characteristic within said given band, said varying characteristic including therein a reference frequency, a detector coupled to said source and said oscillator responsive to said first signal to initiate operation of said oscillator upon occurrence of said first signal, and means coupled to said source and said oscillator responsive to said first and second signals to identify the relative position of the frequency of the signal of said source with respect to said reference frequency.

9. An identification system comprising a first source of signal having a fixed frequency within a given band, a second source of signal having a varying frequency characteristic within said given band and displaced from said fixed frequency, said varying frequency characteristic including therein a reference frequency, means coupled to said first and second source responsive to the signal of said first source to initiate operation of said second source to provide the signal of said second source simultaneously with the presence of the signal of said first source, mixer means coupled to said first and second sources to provide at the output thereof a beat frequency signal, means coupled to the output of said mixed means to provide an output signal indicative of the relative position of the fixed frequency of the signal of said first source with respect to said reference frequency.

10. An identification system comprising a first source of signal having a fixed frequency within a given band, a second source of signal having a varying frequency characteristic within said given band, said varying frequency characteristic including therein a reference frequency, means coupled to said first and second source responsive to the signal of said first source to initiate operation of said second source to provide the signal of said second source simultaneously with the presence of the signal of said first sources, mixer means coupled to said first and second sources to provide at the output thereof a beat frequency signal having a varying frequency characteristic, and slope sensing means coupled to the output of said mixer means to provide an output signal indicative of the relative position of the frequency of the signal of said first source with respect to said reference frequency, said slope sensing means including filter means coupled to the output of said mixer means to provide a signal having an energy amplitude characteristic proportional to the varying frequency characteristic of said beat frequency signal, and a rate of change sensing means coupled to the output of said filter means to provide said output signal with a first characteristic indicative of the frequency of the signal of said first source being disposed below said reference frequency and a second characteristic indicative of the frequency of the signal of said first source being disposed above said reference frequency.

11. An identification system comprising a first source of signal having a fixed frequency within a given band, a second source of signal having a varying frequency characteristic within said given band, said frequency characteristic including therein a reference frequency, means coupled to said first and second source responsive to the signal of said first source to initiate operation of said second source to provide the signal of said second source simultaneously with the presence of the signal of said first source, frequency mixer means coupled to said first and second sources to provide at the output thereof a beat frequency signal having a varying frequency characteristic, filter means coupled to the output of said mixer means to provide a signal having an energy amplitude proportional to the varying frequency characteristic of said beat frequency signal, differentiator means coupled to the output of said filter means to provide a signal having a first polartity indicative of the frequency of the signal of said first source being disposed below said reference frequency and a second polarity indicative of the frequency of the signal of said first source being disposed above said reference frequency.

12. A communication system comprising a source of first signal having a frequency within a given band, a source of second signal having a varying frequency characteristic in said given band, said varying frequency characteristic including therein a reference frequency, said source of second signal being coupled to said source of first signal responsive to said first signal, first means coupled to said source of first signal and said source of second signal responsive to said first signal and said second signal to provide an identification signal indicative of the relative position of the frequency of said first signal with respect to said reference frequency, and second means coupled to said first means responsive to said identification signal to control the extraction of said first signal.

13. A communication system comprising at least one receiving station, a source of first signal having a frequency within a given band, a source of second signal having a varying frequency characteristic in said given band, said varying frequency characteristic including therein a reference frequency, said source of second signal being coupled to said source of first signal responsive to said first signal, first means coupled to said source of first signal and said source of second signal responsive to said first signal and said second signal to provide an identification signal indicative of the relative position of the frequency of said first signal with respect to said reference frequency, second means coupled to said first means and a selected one of said source of first signal and said first means for coupling said identification signal and a signal related to said first signal to said receiving station, and third means disposed in said receiving station coupled to said second means responsive to said identification signal to control the reception of said first signal.

14. A communication system comprising at least one sending station, at least one receiving station, a source of first signal having a frequency within a given band, a source of second signal having a varying frequency characteristic in said given band, said varying frequency characteristic including therein a reference frequency, said source of second signal being coupled to said source of first signal responsive to said first signal, first means disposed in said sending station coupled to said source of first signal and said source of second signal responsive to said first signal and said second signal to provide an identification signal indicative of the relative position of the frequency of said first signal with respect to said reference frequency, second means coupled to said first means and a selected one of said source of first signal and said first means for coupling said identification signal and a signal related to said first signal to said receiving station, and third means disposed in said receiving station coupled to said second means responsive to said identification signal to control the extraction of said first signal.

15. A communication system comprising a sending station, a receiving station, a source of first signal disposed in said sending station, said first signal having a frequency within a given band, a source of second signal disposed in said sending station coupled to said source of first signal responsive to said first signal, said second signal having a varying frequency characteristic within said given band, said varying frequency characteristic including therein a reference frequency, first means disposed in said sending station coupled to said source of first signal and said source of second signal responsive to said first signal and said second signal to provide an identification signal indicative of the relative position of the frequency of said first signal with respect to said reference frequency, second means coupled to said first means and a selected one of said source of first signal and said first means for coupling said identification signal and a signal related to said first signal to said receiving station, and third means disposed in said receiving station coupled to said second means responsive to said identification signal to control the extraction of said first signal.

16. A communication system comprising a sending station, a receiving station, a source of first signal disposed in said sending station, said first signal having a frequency within a given band, a source of second signal disposed in said sending station, coupled to said source of first signal responsive to said first signal, said second signal having a varying frequency characteristic within said given band, said varying frequency characteristic including therein a reference frequency, mixer means disposed in said sending station coupled to said source of first signal and said source of second signal responsive to said first and second signals to provide a beat frequency signal, first means disposed in said sending station coupled to said mixer means responsive to said beat frequency signal to provide an identification signal indicative of the relative position of the frequency of said first signal with respect to said reference frequency, second means coupled to said first means and a selected one of said source of first signal and said mixer means for coupling said identification signal and a signal related to said first signal to said receiving station, and third means disposed in said receiving station coupled to said second means responsive to said identification signal to control the extraction of said first signal.

17. A communication system comprising a sending station including a source of first signal having a fixed frequency within a given band, a source of second signal having a varying frequency characteristic within said given band, said frequency characteristic including therein a reference frequency, said source of second signal being coupled to said source of first signal responsive to said first signal, mixer means coupled to said source of first signal and said source of second signal responsive to said first and second signals to provide a beat frequency signal having a varying frequency characteristic, slope sensing means coupled to said mixer means responsive to said beat frequency signal to provide an identification signal indicative of the relative position of the frequency of said first signal with respect to said reference frequency, and first means coupled to said slope sensing means to encode said identification signal; a receiving station; second means coupled to said first means and a selected one of said source of first signal and said mixer means for coupling said encoded identification signal and a signal related to said first signal to said receiving station; and third means disposed in said receiving station coupled to said second means responsive to said signal related to said first signal and said encoded identification signal to control the extraction of said first signal.

18. A communication system comprising a sending station including a source of first signal having a fixed frequency within a given band, a source of second signal having a varying frequency characteristic within said given band, said frequency characteristic including therein a reference frequency, said source of second signal being coupled to said source of first signal responsive to said first signal, mixer means coupled to said source of first signal and said source of second signal responsive to said first and second signals to provide a beat frequency signal having a varying frequency characteristic, slope sensing means coupled to said mixer means responsive to said beat frequency signal to provide an identification signal indicative of the relative position of the frequency of said first signal with respect to said reference frequency, and first means coupled to said slope sensing means to encode said identification signal; a receiving station; second means coupled to said first means and said source of first signal for coupling said encoded identification signal and said first signal to said receiving station; and third means disposed in said receiving station coupled to said second means responsive to said first signal and said encoded identification signal to control the extraction of said first signal.

19. A communication system comprising a sending station including a source of first signal having a fixed frequency within a given band, a source of second signal having a varying frequency characteristic within said given band, said frequency characteristic including therein a reference frequency, said source of second signal being coupled to said source of first signal responsive to said first signal, first frequency mixer means coupled to said source of first signal and said source of second signal responsive to said first and second signals to provide at the output thereof a beat frequency signal having a varying frequency characteristic, slope sensing means coupled to said mixer means responsive to said beat frequency signal to provide an identification signal indicative of the relative position of the frequency of said first signal with respect to said reference frequency, and first means coupled to said slope sensing means to encode said identification signal; a receiving station; second means coupled to said first means and said mixer means coupling said beat frequency signal and said encoded identification signal to said receiving station; and third means disposed in said receiving station coupled to said second means responsive to said beat frequency signal and said encoded identification signal to control the extraction of said first signal.

20. A communication system comprising a sending station including a source of first signal having a fixed frequency within a given band, a source of second signal having a first varying frequency characteristic within said given band, said first frequency characteristic including therein a reference frequency, said source of second signal being coupled to said source of first signal responsive to said first signal, first frequency mixer means coupled to said source of first signal and said source of second signal responsive to said first and second signals to provide at the output thereof a beat frequency signal, filter means coupled to the output of said first mixer means to provide a signal having an energy amplitude proportional to the frequency of said beat frequency signal, differentiator means coupled to said filter means to differentiate said energy amplitude signal to provide an identification signal having a first polarity indicative of the frequency of said first signal being disposed below said reference frequency and a second polarity indicative of the frequency of said first signal being disposed above said reference frequency, encoder means coupled to the output of said differentiator means to provide a code signal indicative of the polarity of said identification signal; a receiving station; and first means coupled to said encoder means and said first mixer means for coupling said code signal and said beat frequency signal to said receiving station; said receiving station including decoder means coupled to said first means to detect said code signal, a source of third signal coupled to said decoder means responsive to said detected code signal, said third signal having a second varying frequency characteristic substantially equal to said first varying frequency characteristic within said given band, said second frequency characteristic including therein said reference frequency, second frequency mixer means coupled to said first means and said source of third signal responsive to said third signal and said beat frequency signal to provide a resultant signal substantially equal to said first signal, first utilization means to utilize said resultant signal when the frequency thereof is disposed below said reference frequency, a second utilization means to utilize said resultant signal when the frequency thereof is disposed above said reference frequency, and second means coupled to said decoder means and said second mixer means responsive to said detected code signal indicative of said first polarity to couple said resultant signal to said first utilization and to said detected sode signal indicative of said second polarity to couple said resultant signal to said second utilization means.

References Cited by the Examiner

UNITED STATES PATENTS

| | | | |
|---|---|---|---|
| 1,830,242 | 11/31 | Ranger | 340—171 |
| 2,144,215 | 1/39 | Beverage | 340—171 |
| 2,333,992 | 11/43 | Fox | 340—171 |
| 2,337,328 | 12/43 | Hathaway | 324—79 |
| 2,475,074 | 7/49 | Bradley et al. | 331—4 |
| 2,483,311 | 9/49 | Blok | 324—79 |
| 2,513,342 | 7/50 | Marshall | 340—171 |
| 2,522,139 | 9/50 | Schoenbaum | 328—134 |
| 2,619,590 | 11/52 | Williams | 325—335 |
| 2,882,395 | 4/59 | White | 325—332 |
| 2,991,416 | 7/61 | Ramp et al. | 328—134 |
| 3,008,124 | 11/61 | Warnock | 340—170 |
| 3,037,190 | 5/62 | Herbst | 340—170 |

NEIL C. READ, *Primary Examiner.*

IRVING SRAGOW, *Examiner.*